US006188554B1

(12) United States Patent
Chung

(10) Patent No.: US 6,188,554 B1
(45) Date of Patent: Feb. 13, 2001

(54) PROTECTING CIRCUIT OF A CHARGER WITHOUT SPARK

(76) Inventor: Lee Hsin-Chih Chung, No. 21-8, Shang San Cho Woo, Wuchang-Li, Chungli City, Tao Yuan Hsien (TW)

( * ) Notice: Under 35 U.S.C. 154(b), the term of this patent shall be extended for 0 days.

(21) Appl. No.: 09/332,456

(22) Filed: Jun. 14, 1999

(51) Int. Cl.[7] ....................................................... H02H 9/00
(52) U.S. Cl. ............................... 361/58; 307/86; 320/112; 320/165
(58) Field of Search ................................ 361/58, 88, 93.9, 361/89, 100; 307/38, 39, 42, 52, 62, 85, 86, 87, 99, 116, 135, 150; 320/112, 165, FOR 137, FOR 139, FOR 141

(56) References Cited

U.S. PATENT DOCUMENTS 5,477,130 * 12/1995 Hashimoto et al. .................... 320/49
5,793,186 * 8/1998 Watabe et al. ........................ 320/112
6,008,627 * 12/1999 Narita ................................... 320/134

* cited by examiner

Primary Examiner—Ronald W. Leja

(57) ABSTRACT

A sensing terminal and a receptacle are installed in a charge battery and a charger, respectively. During charging, a charging circuit within the charger will detect whether the battery is pulled out from the charger. If the battery is pulled out, the power source will be turned off in a very short time so that no voltage will be sent from the terminal of the charger in order to protect the charger. As the charge battery is pulled out from the charger, no spark is generated and the battery is prevented from being burned out.

4 Claims, 3 Drawing Sheets

PROTECTING CIRCUIT OF A CHARGER WITHOUT SPARK

FIELD OF THE INVENTION

The present invention relates to a protecting circuit of a charger without spark, and in particular to a circuit by which sparks can be prevented from being induced as a charge battery is pulled out from the charger far protecting the charge

BACKGROUND OF THE INVENTION

In electromotive machines (such as electric drilling machines, electric spanners, etc), in order to avoid the restriction and inconvenience due to power cord connection, power may be supplied to an electromotive machine from a battery.

There are three kinds of chargers in the prior art. For a charger requiring large power supply, a transformer is used. Since a transformer has a large volume, the charger is heavy and very inconvenient to use. If a charger is designed as an universal charger (which can be used to charge batteries of 7.2 V, 9.6 V, 16 V, etc), matching parts have to be added to the system and consequently the cost is greatly increased. The second kind of charger has a design of electron exchange. This kind of charger needs high cost to manufacture, and is not suitable for general consumers. The third kind of charger has a design of capacitor charging. It is most economic and has a light weight, but in general it often sparks (electric arc) on the terminal as the battery is pulled out. Therefore, the semiconductor device in the charger gets very high current peak which may cause a dangerous accident. Sometimes, even the whole charger may burn out.

SUMMARY OF THE INVENTION

Accordingly, the primary object of the present invention is to provide a protecting circuit of a charger without spark. A sensing terminal and a receptacle are installed in a charge battery and the charger, respectively. During charging, the charging circuit within the charger will detect whether the battery is pulled out from the charger by monitoring the sensing terminal. If the battery is pulled out, the power source will be turn off in time before the positive terminal disconnects so that no voltage will be sent from the charger in order to prevent spark from being generated. Therefore, the charger is protected from being burned out by high voltage spark.

The various objects and advantages of the present invention will be more readily understood from the following detailed description when read in conjunction with the appended drawing.

DETAILED DESCRIPTION OF THE PREFERRED EMBODIMENTS

Figure 1:
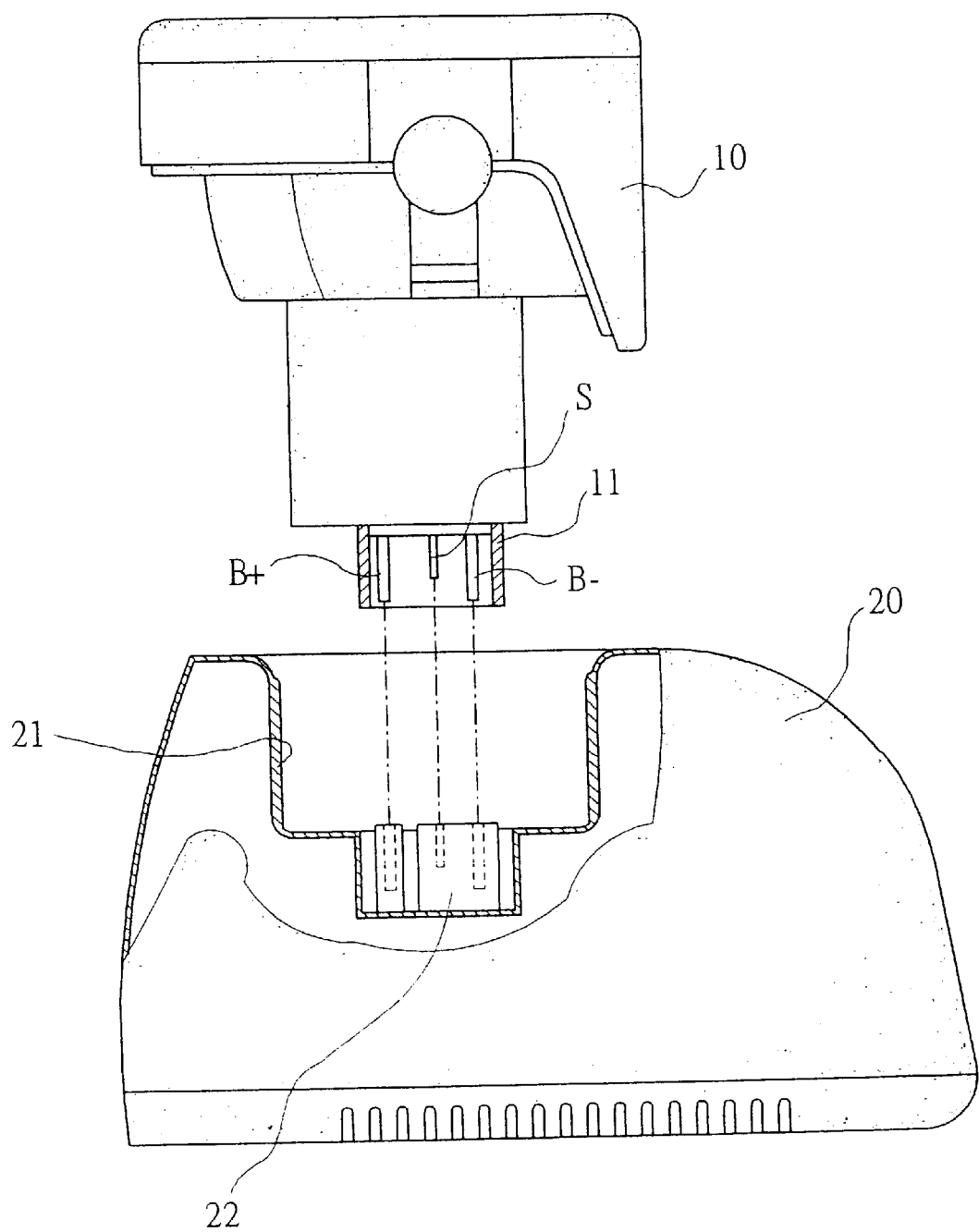
FIG. 1 is an exploded view of the present invention.

As shown in FIG. 1, an exploded view of the protecting circuit of a charger without spark of the present invention is illustrated. An inserting portion 11 is installed on the lower end of the charge battery 10. The inserting portion includes two charging terminals B+ and B- (positive and negative terminals) and a sensing terminal S. Between the two charging terminals B+ and B- and a sensing terminal S is a difference in elevation (the sensing terminal is shorter). A concave space 21 for receiving the charge battery 10 is formed in the charger 20. Within the concave space 21 is mounted with a receptacle 22 having holes for receiving the two charging terminals B+ and B- and a sensing terminal S.

Figure 2:
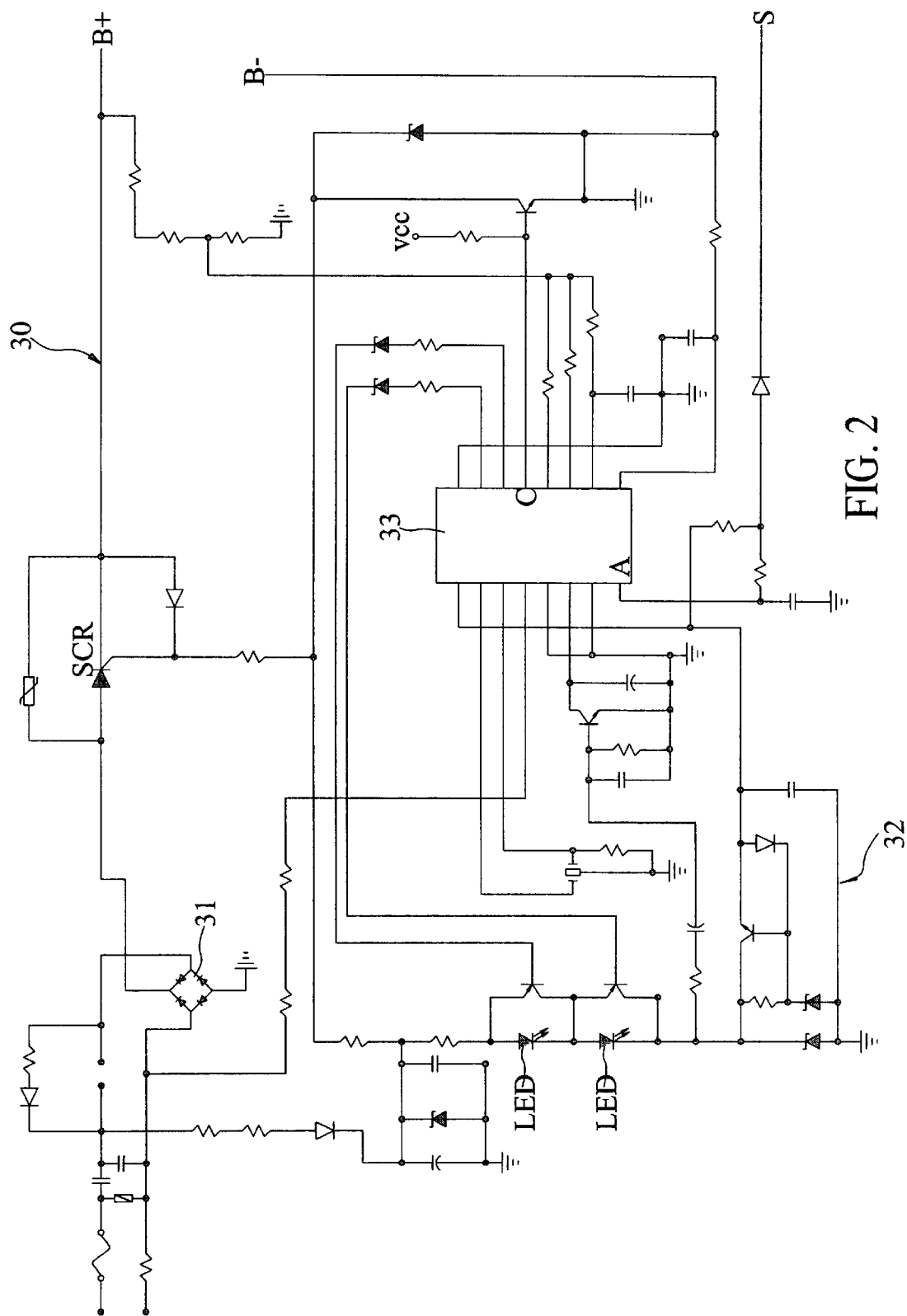
FIG. 2 is a detailed circuit of the charger of the present invention.

As shown in FIG. 2, a detailed structure of the charger is illustrated. A charging circuit 30 comprises an SCR. The output voltage of a rectifier 31 is connected with the SCR. The output of the SCR is connected to the receptacle hole corresponding to the positive charging terminal B+. The control terminal of the SCR is connected with two serial LEDs and a regulator 32. The LEDs display the charging condition of the charger 20. The regulator 31 serves to generate the working voltage VCC required by an integrated circuit and then the voltage is transferred to the sensing pin A of the integrated circuit 33 for serving as a base voltage level.

The integrated circuit 33 is a primary control unit. The sensing pin A thereof is connected the receptacle hole corresponding to the sensing terminal S for comparing the voltage variation on the sensing terminal S when the charge battery 10 is inserted into the charger 20 and the voltage variation on the sensing terminal S when the charge battery 10 is pulled out from the charger 20. According to the result of measurement, the voltage of the sensing terminal S when the charge battery 10 is connected is different from when as the charge battery 10 is pulled out. By the variation of voltage, the integrated circuit 33 can determine whether the charge battery 10 is pulled out. Further, the elevation difference between two charging terminals B+ and B- for positive and negative terminals and the sensing terminal S is used as detecting data. When the sensing terminal S is separated with the charger, the charging terminals B+ and B- for positive and negative terminals still contact with the receptacle 22 of the charger, and thus the integrated circuit determines that the battery has been separated from the charger. Furthermore, the integrated circuit is installed with a control pin C which is connected with the control end of the SCR. During charging, the pin outputs pulse signal continuously to cause the SCR to be retained in an ON state so that the charging voltage is sent to the positive charging terminals B+. When the charge battery 10 is pulled out, the sensing pin A will sense the voltage variation, and then the integrated circuit 33 will stop to sending the output of the signal pin C and then turn off the SCR to stop sending charging voltage.

Figure 3:
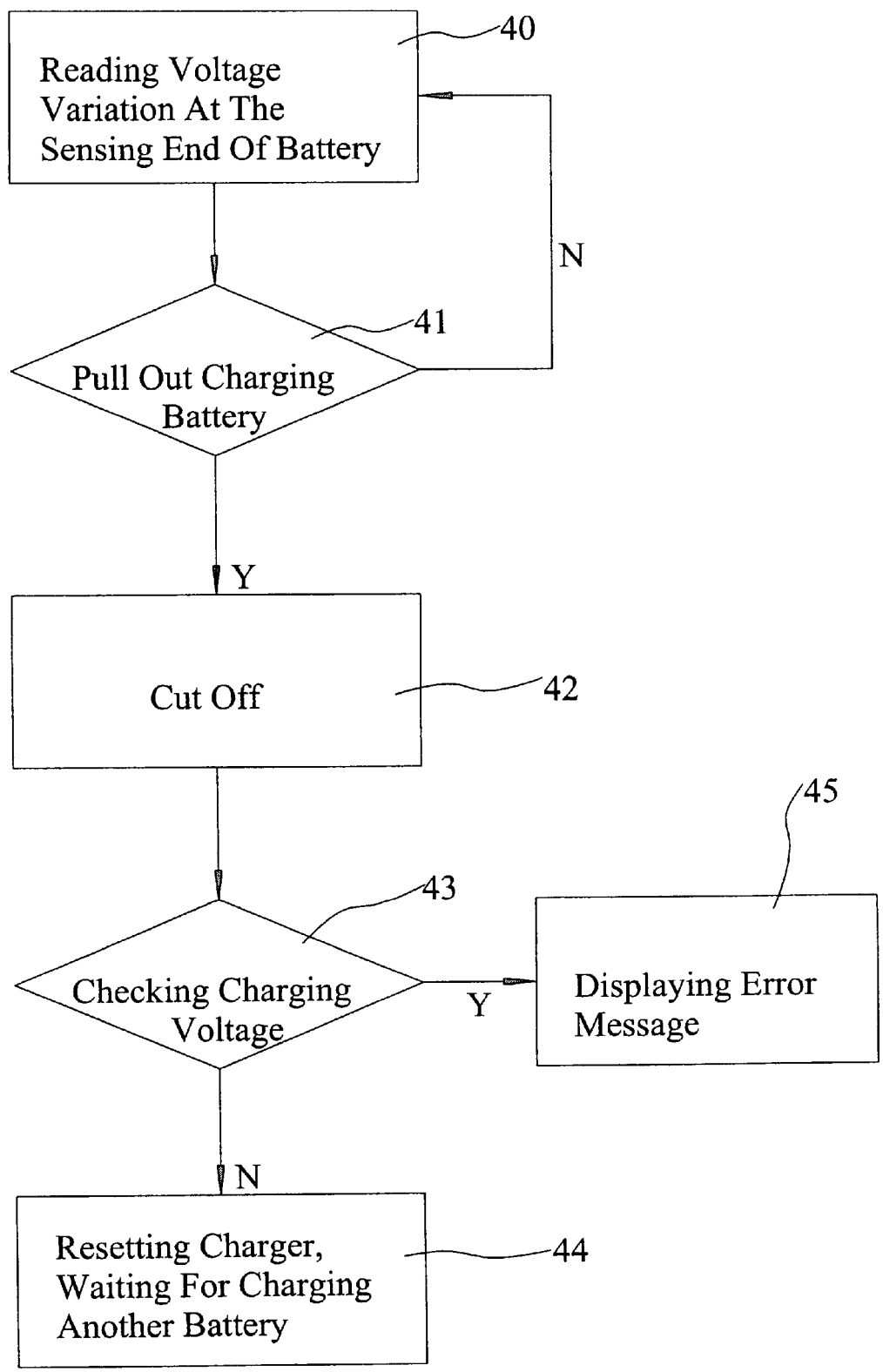
FIG. 3 is the flow diagram for the operation of the present invention.

As shown in FIG. 3, the flow diagram for the operation of the present invention is disclosed. During charging, the integrated circuit 33 reads the voltage variation of the sensing pin (40). If it discovers that the charge battery 10 has been pulled out (41), the integrated circuit will stop the output of the control signal pin in time when positive and negative terminals of the battery are still in contact with the charger contacts (in this embodiment it remains in contact for 2 ms) and then turn off the SCR so that no voltage is sent from the charger (42). In the instance that the charge battery 10 is pulled out, no spark will be generated. Next, the integrated circuit 33 will further check the charging voltage (43). If there is no charging voltage, the SCR is turned off for a period of time (in this embodiment it is 5 ms), and then the charging voltage is generated again so that the charger is in a ready condition waiting for charging other batteries (44). If the charging voltage still exists, then it is probable that the electronic elements have taults, or are aged, or are in other ill conditions (45). Thus an LED will light up to alarm the user.

In summary, the protecting circuit of a charger without spark of the present invention not only has practical effects, but also is a novel design. Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A charger without spark, comprising:
    a receptacle having holes for receiving positive and negative charging terminals and a sensing terminal of a charge battery, said sensing terminal being shorter than said charging terminals;
    a protecting circuit including an SCR being connected between a power source and a receptacle hole corresponding to said positive charging terminal, and an integrated circuit having a sensing pin connected to a receptacle hole corresponding to said sensing terminal, and a control signal pin for turning on or off said SCR based on a voltage detected at said sensing pin;
    wherein said integrated circuit detects voltage variation of said sensing terminal and turns off said SCR by means of said control signal pin while said sensing terminal is disconnected from said receptacle before said charging terminals are disconnected so that no spark is generated while said charge battery is pulled out from said charger.

2. The charger without spark as claimed in claim 1, wherein said SCR is turned on again by said integrated circuit so that said charger is in a ready condition after being turned off for a predetermined period of time while said charge battery is pulled out from said charger.

3. The charger without spark as claimed in claim 1, wherein said protecting circuit further includes a regulator for generating a working voltage required by said integrated circuit and a base voltage for said sensing pin.

4. The charger without spark as claimed in claim 3, wherein said integrated circuit determines if said charge battery is pulled out or not by comparing the voltage detected at said sensing pin with said base voltage.

* * * * *